US011055129B2

(12) United States Patent
Vrind et al.

(10) Patent No.: US 11,055,129 B2
(45) Date of Patent: Jul. 6, 2021

(54) METHOD, SYSTEM, APPARATUS, AND/OR NON-TRANSITORY COMPUTER READABLE MEDIUM FOR THE SCHEDULING OF A PLURALITY OF OPERATING SYSTEM TASKS ON A MULTICORE PROCESSOR AND/OR MULTI-PROCESSOR SYSTEM

(71) Applicant: Samsung Electronics Co., Ltd., Suwon-si (KR)

(72) Inventors: Tushar Vrind, Bangalore (IN); Chandan Kumar, Bangalore (IN); Raju Udava Siddappa, Bangalore (IN); Balaji Somu Kandaswamy, Bangalore (IN); Venkata Raju Indukuri, Bangalore (IN)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 16/053,172

(22) Filed: Aug. 2, 2018

(65) Prior Publication Data

US 2019/0087224 A1 Mar. 21, 2019

(30) Foreign Application Priority Data

Sep. 20, 2017 (IN) .............................. 201741033259

(51) Int. Cl.
*G06F 9/46* (2006.01)
*G06F 9/48* (2006.01)
(52) U.S. Cl.
CPC .......... *G06F 9/4818* (2013.01); *G06F 9/4881* (2013.01); *G06F 9/4893* (2013.01)

(58) Field of Classification Search
CPC ....................................................... G06F 9/4881
USPC .......................................................... 718/103
See application file for complete search history.

(56) References Cited

U.S. PATENT DOCUMENTS

| | | | | |
|---|---|---|---|---|
| 5,928,322 A | * | 7/1999 | Bitar ..................... | G06F 9/4887 718/103 |
| 8,533,696 B1 | * | 9/2013 | Chalmer ............... | G06F 9/4881 717/149 |
| 9,063,796 B2 | * | 6/2015 | Giusto .................. | G06F 9/4881 |
| 9,229,765 B2 | * | 1/2016 | Lee ....................... | G06F 9/4856 |
| 9,298,504 B1 | * | 3/2016 | Vincent ................. | G06F 9/5077 |
| 9,329,912 B2 | * | 5/2016 | John ...................... | G06F 9/544 |
| 9,411,641 B2 | * | 8/2016 | Dickson ................ | G06F 9/5038 |

(Continued)

OTHER PUBLICATIONS

Harco Kuppens. "Real-time Linux (Xenomai) Radboud University Nijmegen: Exercise #5—Round-Robin Task Scheduling". http://www.cs.kun.nl/J.Hooman/DES/XenomaiExercises/Exercise-5.html.

(Continued)

*Primary Examiner* — Mehran Kamran
(74) *Attorney, Agent, or Firm* — Harness, Dickey & Pierce, P.L.C.

(57) ABSTRACT

Various example embodiments herein provide a computerized method for scheduling a plurality of tasks for an operating system on a multicore processor. The method includes identifying the plurality of tasks to be executed on the multicore processor and determining a task schedule for scheduling of the plurality of tasks by providing a higher preference to the CPU-bound task than the non CPU-bound task. Further, the method includes scheduling the plurality of tasks on the multicore processor based on the task schedule.

12 Claims, 9 Drawing Sheets

(56) References Cited

U.S. PATENT DOCUMENTS

| | | | |
|---|---|---|---|
| 2003/0018691 A1* | 1/2003 | Bono | G06F 9/5033 718/106 |
| 2004/0054999 A1* | 3/2004 | Willen | G06F 9/5044 718/103 |
| 2005/0080824 A1* | 4/2005 | Vaidyanathan | G06F 9/4881 |
| 2005/0108720 A1* | 5/2005 | Cervini | G06F 9/4843 718/105 |
| 2006/0126559 A1* | 6/2006 | Jun | H04L 47/2433 370/329 |
| 2006/0133418 A1* | 6/2006 | Anand | H04L 47/10 370/468 |
| 2006/0136574 A1* | 6/2006 | Anand | H04L 67/322 709/219 |
| 2006/0168217 A1* | 7/2006 | Anand | H04L 67/32 709/225 |
| 2006/0282836 A1* | 12/2006 | Barker | G06F 9/526 718/103 |
| 2007/0011682 A1* | 1/2007 | Loboz | G06F 9/466 718/104 |
| 2008/0052716 A1* | 2/2008 | Theurer | G06F 9/4881 718/103 |
| 2008/0168454 A1* | 7/2008 | Choi | G06F 9/524 718/103 |
| 2009/0276781 A1* | 11/2009 | Chan | G06F 9/4881 718/103 |
| 2010/0138221 A1* | 6/2010 | Boys | G10L 15/28 704/235 |
| 2011/0010716 A1* | 1/2011 | Raghuraman | G06F 9/4881 718/102 |
| 2011/0276978 A1* | 11/2011 | Gaiarsa | G06F 9/46 718/104 |
| 2012/0185862 A1* | 7/2012 | Arcese | G06F 9/4881 718/103 |
| 2012/0198457 A1* | 8/2012 | Leonelli | G06F 8/34 718/102 |
| 2012/0222035 A1* | 8/2012 | Plondke | G06F 9/4881 718/103 |
| 2012/0233609 A1* | 9/2012 | Blythe | G06F 11/3419 718/1 |
| 2012/0284732 A1* | 11/2012 | Griglock | G06F 9/5066 718/104 |
| 2013/0117757 A1* | 5/2013 | Jung | G06F 9/4881 718/103 |
| 2013/0318531 A1* | 11/2013 | Trippi | G06F 9/5033 718/102 |
| 2014/0137126 A1* | 5/2014 | Varshney | G06F 9/48 718/102 |
| 2014/0282572 A1* | 9/2014 | Kang | G06F 9/4881 718/103 |
| 2015/0058861 A1* | 2/2015 | Zheng | G06F 9/4887 718/104 |
| 2015/0074674 A1* | 3/2015 | Ma | G06F 9/4887 718/103 |
| 2015/0113540 A1* | 4/2015 | Rabinovici | G06F 9/5011 718/104 |
| 2015/0234612 A1* | 8/2015 | Himelstein | G06F 13/00 714/6.21 |
| 2015/0301854 A1* | 10/2015 | Park | G06F 9/4881 718/102 |
| 2015/0301858 A1* | 10/2015 | Chung | G06F 9/4893 718/103 |
| 2016/0092270 A1* | 3/2016 | Uniyal | G06F 9/505 718/104 |
| 2016/0266929 A1* | 9/2016 | Lu | G06F 9/5027 |
| 2016/0364263 A1* | 12/2016 | Cao | G06F 9/4881 |
| 2017/0060640 A1* | 3/2017 | Wang | G06F 9/5038 |
| 2017/0090988 A1* | 3/2017 | Young | G06F 9/5038 |
| 2018/0101486 A1* | 4/2018 | Lu | G06F 9/5033 |
| 2018/0341525 A1* | 11/2018 | Gupta | G06F 9/505 |

OTHER PUBLICATIONS

Oar Corporation. "Scheduling Concepts Task Priority and Scheduling: 18.2.1—Task Priority and Scheduling". RTEMS 4.6.2 On-Line Library. 1.

* cited by examiner

METHOD, SYSTEM, APPARATUS, AND/OR NON-TRANSITORY COMPUTER READABLE MEDIUM FOR THE SCHEDULING OF A PLURALITY OF OPERATING SYSTEM TASKS ON A MULTICORE PROCESSOR AND/OR MULTI-PROCESSOR SYSTEM

CROSS-REFERENCE TO RELATED APPLICATION

A claim for the benefit of priority under 35 U.S.C. § 119 is made to Indian Patent Application No. 201741033259 filed on Sep. 20, 2017, in the Office of the Controller General of Patents, Designs & Trade Marks (CGPDTM), the entire contents of which are hereby incorporated by reference.

FIELD

Various example embodiments herein relate to multicore processors, multicore computing systems, and/or multiprocessor systems, and more particularly relate to a method, a system, an apparatus, and/or a non-transitory computer readable medium for scheduling operating system (OS) tasks or decisions by considering a CPU-bound task and a non-CPU bound task having a same priority and accordingly scheduling the CPU-bound task and the non-CPU bound task on a multicore processor and/or multiprocessor system.

BACKGROUND

In general, the use of a multicore processor for scheduling multiple tasks at a time is known. A task is typically considered to be a single thread of execution in a computing system, be it either a thread in a multi-threaded application, or a process. The tasks may be scheduled for the execution based on the task urgency. Most existing operating systems running on multicore processor platforms use a priority-driven scheduling mechanism to handle urgent tasks, i.e., a pre-emptive task scheduler ensures that the highest-priority ready thread executes on any available core of the multicore processor. Unless a higher priority task preempts the task which is being executed, the task will typically run for a quantum (e.g., a length of time, or time-slice, that the task is allowed to run before another task having the same priority begins to run) or to completion of its current pending activities. However, if the priority of two or more tasks are equal, then the tasks are scheduled based on a FIFO task scheduling mechanism where the task which arrives first is executed first, i.e., a First-In First-Out (FIFO) order is followed irrespective of a type of the tasks or an execution time of the task. When the tasks having equal priority are executed based on the FIFO order, there could be various drawbacks, such as core idling based on an order in which the tasks are executed, etc. Further, tasks may miss deadlines within which they have to be executed. Also, there may be a migration of a non-CPU bound task to another CPU based on priority inversion, which reduces the overall system utilization and efficiency, for example, by increasing cache misses and/or cache trashing.

Thus, it is desired to address the aforementioned disadvantages and/or other shortcomings, or to at least provide a useful alternative.

SUMMARY

Various example embodiments herein provide operating system (OS) scheduling decisions by considering a CPU-bound task and a non-CPU bound task having the same priority and accordingly scheduling the CPU-bound task and the non-CPU bound task on a multicore processor and/or a multi-processor system.

Various example embodiments are directed towards determining a task schedule for scheduling a plurality of tasks which include CPU-bound tasks and non-CPU bound tasks having the same priority, by providing a higher preference to the CPU bound tasks over the non-CPU bound tasks. Further, based on the determined task schedule, deviating from a conventional art predefined and/or desired sequence such as FIFO order for execution of the plurality of tasks is achieved.

Additionally, other example embodiments herein bind a priority bumped non-CPU bound task to execute on a dedicated core of the multicore processor when a priority inversion occurs, to avoid migration of the bumped non-CPU bound task to another core (i.e., CPU) of the multicore processor and/or another processor of a multiprocessor system. This allows the OS to effectively determine the nature and type of tasks at each state and accordingly schedule the tasks to avoid delay involved due to the migration of the tasks to another core of the multicore processor.

Various example embodiments herein improve system load balancing by effectively scheduling the tasks based on the type of the tasks and improve and/or optimize power consumption in the system.

Accordingly, at least one example embodiment herein provide a computerized method for scheduling of tasks for an operating system on a multicore processor. The method includes identifying, using the multicore processor, a plurality of tasks with a same priority level to be executed on the multicore processor, the plurality of tasks comprise at least one CPU-bound task and at least one non CPU-bound task, determining, using the multicore processor, a task schedule for the plurality of tasks, the determining including assigning a higher preference to the at least one CPU-bound task from the plurality of tasks over the at least one non CPU-bound task from the plurality of tasks, and scheduling, using the multicore processor, the plurality of tasks on the multicore processor according to the task schedule.

In at least one example embodiment, the method further includes associating, using the multicore processor, the plurality of tasks with a desired sequence of execution of the tasks on the multicore processor, and scheduling, using the multicore processor, the plurality of tasks based on the task schedule which deviates from the desired sequence of execution of the plurality of tasks on the multicore processor.

In at least one example embodiment, the method includes binding, using the multicore processor, the at least one non CPU-bound task to at least one core of the multicore processor while the at least one non CPU-bound task is accessing TCM (Tightly Coupled Memory) data, and continuing to execute, using the multicore processor, the at least one non CPU-bound task as a CPU-bound task until the accessing of the TCM contents by the at least one non CPU-bound task is completed.

In at least one example embodiment, the method further includes examining, using the multicore processor, past task execution statistics, and automatically scheduling, using the multicore processor, the at least one non CPU-bound task based on results of the examining.

In at least one example embodiment, the examining includes at least one of a schedule aware examination, a task order aware examination, and a cache aware examination of the past task execution statistics.

Additionally, at least one example embodiment herein provide a computerized method for scheduling of tasks for an operating system (OS) on a multicore processor. The method includes detecting, using the multicore processor, a priority inversion when an execution of a non CPU-bound task having a lower priority than a CPU-bound task is preempted on the multicore processor due to a condition required for continued execution of the CPU-bound task being met, detecting, using the multicore processor, that execution of the CPU-bound task is suspended, and scheduling, using the multicore processor, the non CPU-bound task for execution on the multicore processor, the scheduling including binding the non CPU-bound task to at least one CPU core included in the multicore processor.

Additionally, at least one example embodiment herein provide an apparatus for scheduling of tasks. The apparatus includes a memory having stored thereon computer readable instructions, and a multicore processor comprising a plurality of CPU cores, the multicore processor configured to execute the computer readable instructions to, identify a plurality of tasks to be executed on the multicore processor, the plurality of tasks comprises at least one CPU-bound task and at least one non CPU-bound task, and each of the plurality of tasks having a same priority level, determine a task schedule for scheduling of the plurality of tasks, the determining including assigning a higher preference to the at least one CPU-bound task over the at least one non CPU-bound task, and schedule the plurality of tasks on the multicore processor based on the task schedule.

Additionally, at least one example embodiment herein provide an apparatus for scheduling of tasks. The apparatus includes a memory having computer readable instructions stored thereon, and a multicore processor comprising a plurality of CPU cores, the multicore processor configured to execute the computer readable instructions to, detect a priority inversion when an execution of a non CPU-bound task having an lower priority than a CPU-bound task is preempted on the multicore processor due to a condition required for continued execution of the CPU-bound task being met, detect that execution of the CPU-bound task is suspended, and schedule the non CPU-bound task for execution on the multicore processor, the scheduling including binding the non CPU-bound task to at least one CPU core on the multicore processor.

These and other aspects of the example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
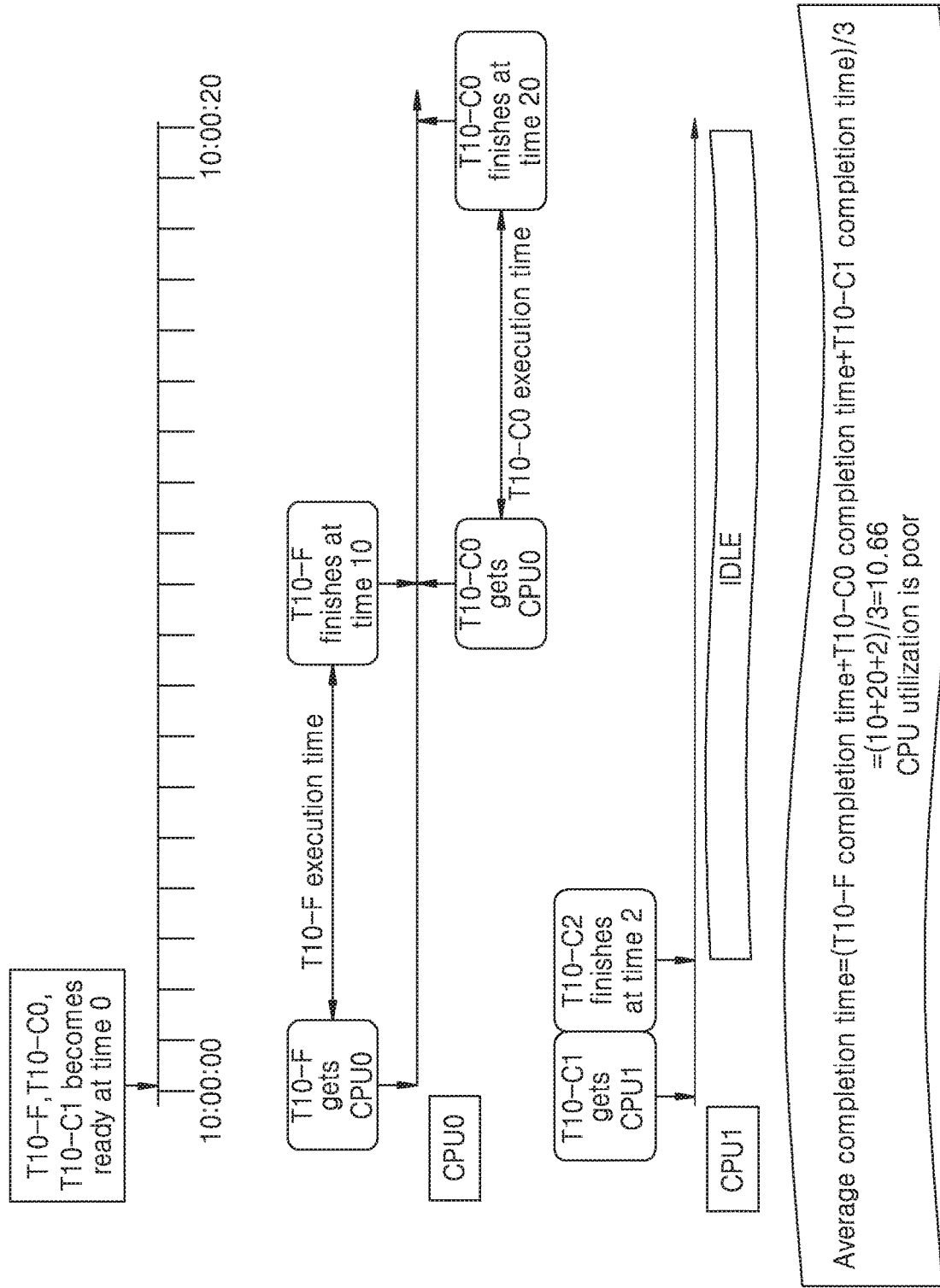
FIG. 1 is an example scenario illustrating scheduling of CPU bound tasks and non-CPU bound tasks having the same priority, according to the prior art.

Various example embodiments of the present disclosure will now be described in detail with reference to the accompanying drawings. In the following description, specific details such as detailed configuration and components are merely provided to assist the overall understanding of these example embodiments of the present disclosure. Therefore, it should be apparent to those skilled in the art that various changes and modifications of the example embodiments described herein may be made without departing from the scope and spirit of the present disclosure. In addition, descriptions of well-known functions and constructions are omitted for clarity and conciseness.

Also, the various example embodiments described herein are not necessarily mutually exclusive, as some example embodiments may be combined with one or more other example embodiments to form new embodiments.

Herein, the term "or" as used herein, refers to a non-exclusive or, unless otherwise indicated. The examples used herein are intended merely to facilitate an understanding of ways in which the example embodiments herein may be practiced and to further enable those skilled in the art to practice the example embodiments herein. Accordingly, the examples should not be construed as limiting the scope of the example embodiments herein.

As is traditional in the field, example embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the example embodiments. Likewise, the blocks of the example embodiments may be physically combined into more complex blocks without departing from the scope of the example embodiments.

In general, task scheduling methods greatly differ according to the system environment and basic assumptions of the system environment. Multicore processors and/or multi-processor systems are used to execute tasks (i.e., processes, threads, etc.) sequentially and/or in parallel on different CPUs (and/or cores) of the multicore processor and/or multi-processor system based on a priority-driven scheduling mechanism. In the priority-driven scheduling mechanism, a pre-emptive task scheduling is adopted where highest-priority tasks are executed on any available processor and/or processor core. Hereinafter, the terms processor and processor core, and multicore processor and multi-processor system will be used interchangeably. However, if the priority of two or more tasks are equal, then the tasks are scheduled based on a First-In First-Out (FIFO) order irrespective of a type of the task and/or an execution time of the task.

The tasks may generally be classified as CPU-bound tasks (also referred to as a core bound task) and non-CPU bound tasks (also referred to as a free running task). In the case of the Core Bound Tasks (CBTs), the CBTs are bound (e.g., scheduled) to execute on a specific core of the multicore processor, whereas the Free Running Tasks (FRTs) are not bound to any specific core and hence may be executed on any available core of the multicore processor. But due to the FIFO order of the task scheduling adopted by the conventional art methods and systems, the tasks are executed in the FIFO order even though the FRTs may be migrated to an idle core for execution.

Conventional art methods and systems define a sequence and/or queue/list for execution of the tasks having same priority without considering the type of the tasks. Unlike the conventional art methods and systems, various example embodiments of the inventive concepts may be used to determine a task schedule for queuing the tasks for execution based on the task types of the tasks to be scheduled. In other words, the task schedule is defined by considering the type of the tasks to be scheduled.

Accordingly, at least one example embodiment herein provides a computerized method for improving and/or optimizing scheduling of tasks for an operating system on a multicore processor and/or multi-processor system. The method includes identifying a plurality of tasks with the same priority (e.g., the same priority level) to be executed on the multicore processor, where the plurality of tasks comprises at least one CPU-bound task and at least one non CPU-bound task. Further, the method includes determining a task schedule for the plurality of tasks, where at least one CPU-bound task from said plurality of tasks is provided (e.g., assigned, granted, etc.) a higher preference over at least one non CPU-bound task from the plurality of tasks. Further, the method also includes scheduling the plurality of tasks on the multicore processor and/or multi-processor system based on the task schedule.

Accordingly, at least one example embodiment herein provides a computerized method for improving and/or optimizing scheduling of tasks for an operating system (OS) on a multicore processor and/or a multi-processor system. The method includes detecting a priority inversion when an execution of a non CPU-bound task having a lower priority than a CPU-bound task is preempted on the multicore processor and/or multi-processor system due to a condition required for continued execution of the CPU-bound task being met. Further, the method includes detecting that an execution of the CPU-bound task is suspended and scheduling the non CPU-bound task by binding the non CPU-bound task to the specific core over which the CPU bound task is executing on the multicore processor and/or multi-processor system.

Unlike the conventional art methods and systems, the method and system of at least one of the example embodiments determines the task schedule by considering the type of the tasks to be scheduled. As the non CPU-bound tasks do not have core affinity and may be executed on any core, the at least one example embodiment provides the higher preference to the same priority CPU-bound tasks over the non CPU-bound tasks so as to achieve improved and/or optimized scheduling of the tasks, which will ensure better utilization of a core, processor, and/or a cache associated with (e.g., located on, assigned to, used by, etc.) the core and/or processor.

Instead of following the conventional art FIFO ordering defined by a conventional art scheduler, at least one example embodiment may be used to execute the tasks by defining a particular sequence of execution of the tasks based on the type of the tasks such as the CPU-bound tasks and the non CPU-bound tasks. Thus, deviation from a desired and/or predefined sequence of execution of the tasks provides effective CPU utilization.

Further, at least one example embodiment allows a scheduler to automatically learn the order of execution of the tasks over a period of time and automatically determine scheduling decisions based on past task execution statistics to allocate the tasks to different cores based on the learning. An improved and/or optimal cache and core utilization may be dynamically achieved based on robust scheduling decisions of the scheduler made based on the learning over a period of time. Such scheduler also stores the core execution history and core specific duration of execution for all of the tasks.

Further, at least one example embodiment allows rescheduling the non CPU-bound task on the core where the non CPU-bound task was scheduled earlier before being preempted based on the scheduler learning. The decision for rescheduling is taken based on two factors:

1. A time gap between the current schedule and the previous schedule, and

2. Last execution duration on a given core and/or processor.

In conventional art methods and systems, the tasks have a large waiting time and response time. The large waiting time and response time of the tasks does not allow the CPU to make full use of the CPU resources, which thereby reduces effective CPU utilization. Unlike the conventional art methods and systems, at least one example embodiment provides for improved and/or optimized scheduling of the tasks by considering the type of the tasks, thereby enhancing CPU utilization.

In the conventional art methods and systems, after the priority inversion of the task has occurred, the bumped non CPU-bound task may be migrated to another CPU for execution because the bumped non CPU-bound task is not bound to any CPU. Unlike the conventional art methods and systems, at least one example embodiment may be used to bind the bumped non CPU-bound task to a specific core over which the CPU bound task is executing to avoid migration of the bumped non CPU-bound task to another CPU, i.e., the bumped non CPU-bound task is converted into CPU-bound task by binding the bumped non CPU-bound task to the specific CPU.

In the conventional art methods and systems, jobs within the tasks may miss a deadline within which the tasks have to be executed due to task scheduling inefficiencies, such as scheduling a task to run on CPU and/or processor which is busy executing another task. For example, the tasks are scheduled based on the FIFO order which does not take the type of the task into consideration. Unlike the conventional art methods and systems, at least one example embodiment schedules the tasks by considering the task type of the tasks to be executed, which allows the jobs within the tasks to not miss the deadline within which the tasks have to be executed.

Referring now to the drawings, and more particularly to FIGS. 1 through 9, where similar reference characters denote corresponding features consistently throughout the figures, there are shown several example embodiments.

FIG. 1 is an example scenario illustrating scheduling of the CPU bound tasks and the non-CPU bound tasks having same priority, according to the prior art.

In conventional art methods and systems, when the priority of the plurality of tasks are equal, the tasks are scheduled based on a FIFO task scheduling mechanism where the task which arrives first is executed first, i.e., the FIFO order is followed irrespective of the type of the tasks and/or the execution time of the task.

Referring to FIG. 1, consider three tasks T10-F, T10-C0 and T10-C1. T10-F indicates a first task with priority 10 which is a non-CPU bound task (e.g., a FRT). Similarly, T10-C0 indicates a second task with priority 10 which is bound to execute on CPU 0 (e.g., is CPU bound or core bound, and therefore must be executed or is assigned to be executed by a particular CPU and/or core), and T10-C1 indicates a third task with priority 10 which is bound to execute on CPU 1. Further, it is observed that all of the tasks have the same priority, e.g., all three tasks have a priority of 10. There are two CPUs, i.e., CPU 0 (or C0) and CPU1 (or C1). All three tasks are ready for execution at time 0, as shown in a task ready list in FIG. 1. The tasks are added to the task ready list in the FIFO order. Further, table 1 shows the order in which the tasks of FIG. 1 were received, the type of the tasks, the instant of time when the tasks were added into the task ready list and the execution time of each of the tasks.

TABLE 1

| Order of the task | Task ID | Type of the task | Task added at time | Execution time |
|---|---|---|---|---|
| 1 | T10-F | Non-CPU bound | 0 | 10 msecs |
| 2 | T10-C0 | CPU bound | 0 | 10 msecs |
| 3 | T10-C1 | CPU bound | 0 | 2 msecs |

According to the FIFO task scheduling mechanism of the conventional art, the tasks are sequentially distributed to the CPUs based on the arrival of the tasks. In the FIFO task scheduling mechanism of the conventional art, the task that arrives first is executed first, i.e., the task scheduling is based on the FIFO order. Since the task T10-F is the first task received by the system (as shown in table 1), the scheduler (not shown) allocates the task T10-F to CPU 0 based on the FIFO task scheduling algorithm of FIG. 1. The next task that is received by the task ready list is the task T10-C0 which is bound (e.g., allocated, assigned, scheduled, etc.) to execute on CPU 0, after the execution of task T10-F, based on the FIFO task scheduling algorithm. Accordingly, CPU 0 is busy executing task T10-F when task T10-C0 is ready to be executed. Further, even though CPU 1 is idle, the scheduler cannot allocate the task T10-C0 to be executed on CPU 1 because the task T10-C0 is bound to be executed by CPU 0. Therefore, the scheduler maps the task T10-C0 to also be executed on CPU 0. But since the task T10-F is already executing on CPU 0, the task T10-C0 will have to wait until the execution of the task T10-F is completed on CPU 0 before starting execution of task T10-C0. The task T10-C1 is the next task in the task ready list. Since the task T10-C1 is also a CPU bound task, and is bound to be executed on CPU 1, the scheduler allocates the task T10-C1 to CPU 1. The task T10-C1 starts execution immediately because CPU1 was idle before the task T10-C1 was allocated to CPU1.

The timeline of CPU 0 shows that the task T10-F will continue to execute until completion before relinquishing CPU 0. At the end of 10 msecs, e.g., at the time when the task T10-F has relinquished CPU 0, the task T10-C0 will start execution on CPU 0. Therefore, CPU 0 is active (e.g., executing tasks) for 20 msecs. Further, the task completion time of the task T10-C0 is 20 msecs because the task T10-C0 may start execution only after the task T10-F has completed execution on CPU 0. The timeline of CPU 1 shows that T10-C1 is executed in 2 msecs after which CPU 1 does not have any other task to be executed because CPU 1 was in an idle state prior to the scheduling of T10-C1 to CPU 1. Further, the average task completion time is computed as:

$$\text{Average task completion time} = \tag{1}$$
$$(T10\text{-}F \text{ completion time} + T10\text{-}C0 \text{ completion time} +$$
$$T10\text{-}C1 \text{ completion time})/3 =$$
$$(10 + 20 + 2)/3 = 10.66 \text{ msecs,}$$

which implies that the CPU utilization of CPUs 0 and 1 is poor.

Therefore, based on the above computation of the average task completion time, it is observed that when tasks having equal priority are executed based on FIFO ordering there are drawbacks, such as core idling, large and/or increased task completion time, etc., which reduces the overall system utilization and efficiency. Further, the average task completion time and the CPU utilization are important factors in multicore processors and/or multi-processor systems, particularly because power consumption is a major concern and inefficient CPU utilization causes increased and unnecessary power consumption. Due to the scheduling of the tasks in the FIFO order, these factors are not taken into consideration which reduces the overall system efficiency.

Figure 2:
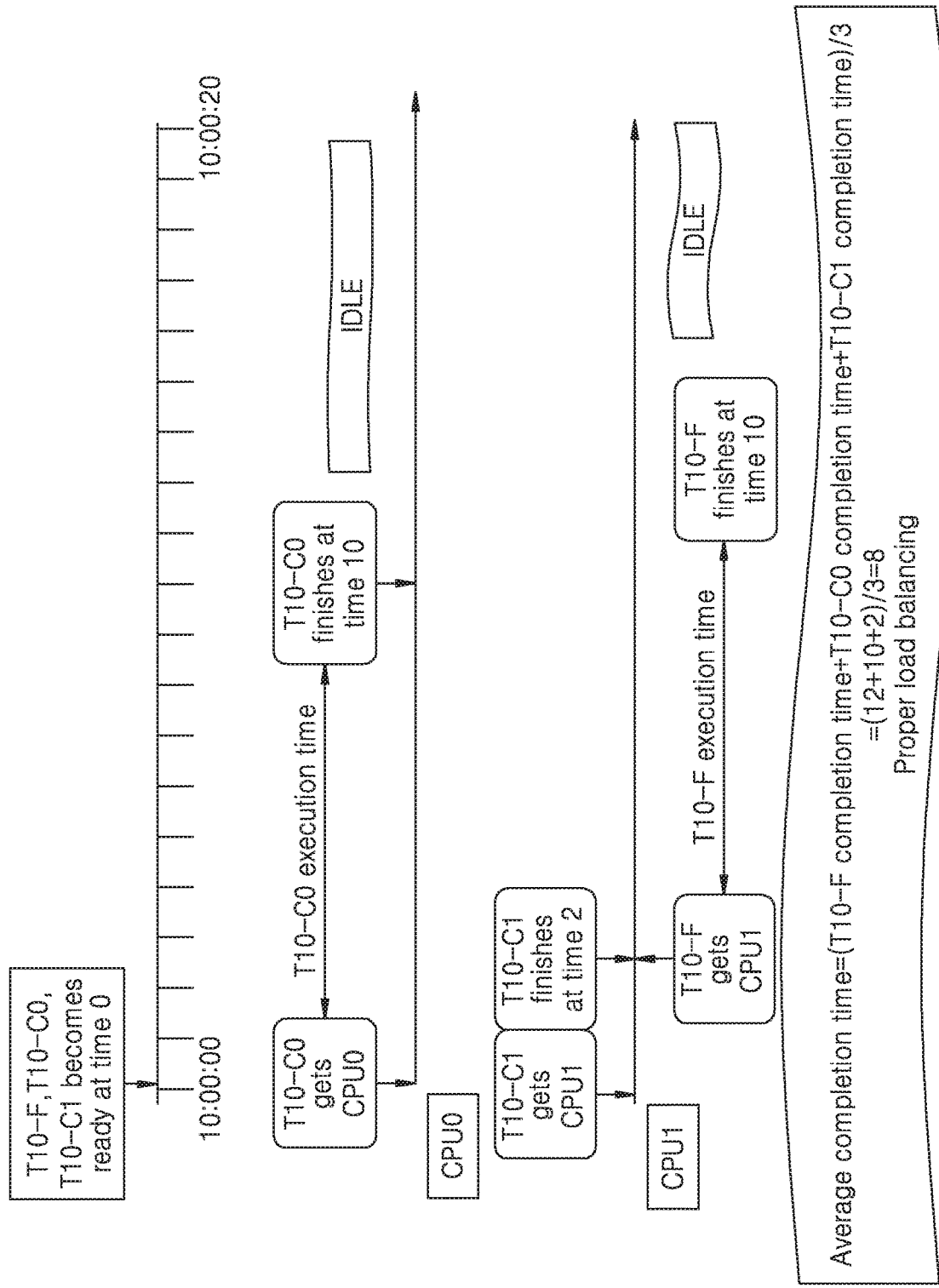
FIG. 2 is an example scenario illustrating scheduling of the CPU bound task and the non-CPU bound task by providing a higher preference to the CPU-bound task over the non CPU-bound task, according to at least one example embodiment.

FIG. 2 is an example scenario illustrating scheduling of the CPU bound tasks and the non-CPU bound tasks by providing a higher preference to the CPU-bound tasks over the non CPU-bound tasks, according to at least one example embodiment.

Unlike the conventional art methods and systems, at least one example embodiment schedules the tasks having the same priority by considering the type of the tasks being scheduled. For example, according to at least one example embodiment, the scheduler provides higher preference to the CPU-bound tasks over the non CPU-bound tasks while scheduling the tasks.

Referring to FIG. 2, in conjunction with FIG. 1, consider three tasks T10-F, T10-C0 and T10-C1, all having the same priority of 10. While only three tasks and two CPUs are illustrated in FIG. 2, the example embodiments are not limited thereto and there may be any number of tasks to be scheduled and/or any number of CPUs. Additionally, while the three tasks of FIG. 2 all have the same priority level, the example embodiments are not limited thereto and the tasks may have any priority level.

Referring to FIG. 2, all three tasks are ready at time 0, as shown in the task ready list. Table 2 shows the order in which the tasks were received in FIG. 2, the type of the tasks, the instant of time when the tasks were added into the task ready list and the execution time of each of the tasks.

TABLE 2

| Order of the task | Task ID | Type of the task | Task added at time | Execution time |
|---|---|---|---|---|
| 1 | T10-F | Non CPU-bound task | 0 | 10 msecs |
| 2 | T10-C0 | CPU-bound task | 0 | 10 msecs |
| 3 | T10-C1 | CPU-bound task | 0 | 2 msecs |

According to at least one example embodiment, the tasks are sequentially distributed to the CPUs based on the type of the tasks to be scheduled. The scheduler is configured to provide a higher preference to the same priority CPU-bound task over the same priority non CPU-bound task while scheduling the tasks. Further, the scheduler allocates the non-CPU-bound tasks to a particular CPU only after that particular CPU has finished executing all of the tasks which are bound to that particular CPU.

The non-CPU bound task T10-F is received first in the task ready list (as shown in FIG. 2) after which the CPU bound task T10-C0 is received. But the scheduler allocates the CPU bound task T10-C0 first to be executed on CPU 0 before allocating the non-CPU bound task T10-F, because the CPU bound tasks are given higher preference over the non-CPU bound task while scheduling the tasks. The next task in the task ready list is the CPU bound task T10-C1 which is bound to CPU 1. The scheduler allocates the CPU bound task T10-C1 to CPU 1. Further, the execution time of the CPU bound task T10-C1 is 2 msecs according to Table 2. At the end of 2 msecs, when the CPU bound task T10-C1 has finished execution on CPU 1, the scheduler allocates the non-CPU bound task T10-F, which was received first, to CPU 1. Therefore, CPU 0 is active for 10 msecs (i.e., the execution time of the CPU bound task T10-C0) and CPU 1 is active for 12 msecs (i.e., the execution time of the CPU bound task T10-C1 and the non-CPU bound task T10-F). The execution time of the CPU bound task T10-C0 is only 10 msecs as compared to 20 msecs (according to the conventional art FIFO scheduling mechanism described under FIG. 1) as the tasks are scheduled based on the consideration of the type of the tasks. Further, the average task completion time for all of the tasks across both CPUs is computed as:

$$\text{Average task completion time} = \quad (1)$$
$$(T10\text{-}F \text{ completion time} + T10\text{-}C0 \text{ completion time} +$$
$$T10\text{-}C1 \text{ completion time})/3 = (12+10+2)/3 = 8 \text{ msecs}.$$

Thus based on the above example computation of the average task completion time, it is observed that when tasks of equal priority are executed by providing higher preference to the CPU bound tasks over non-CPU bound tasks, the average task completion time has improved. Hence, by providing higher preference to CPU-bound task over non CPU-bound task while scheduling the tasks, the scheduler provides improved load balancing, power improvement and/or power optimization and increased system efficiency.

Figure 3:
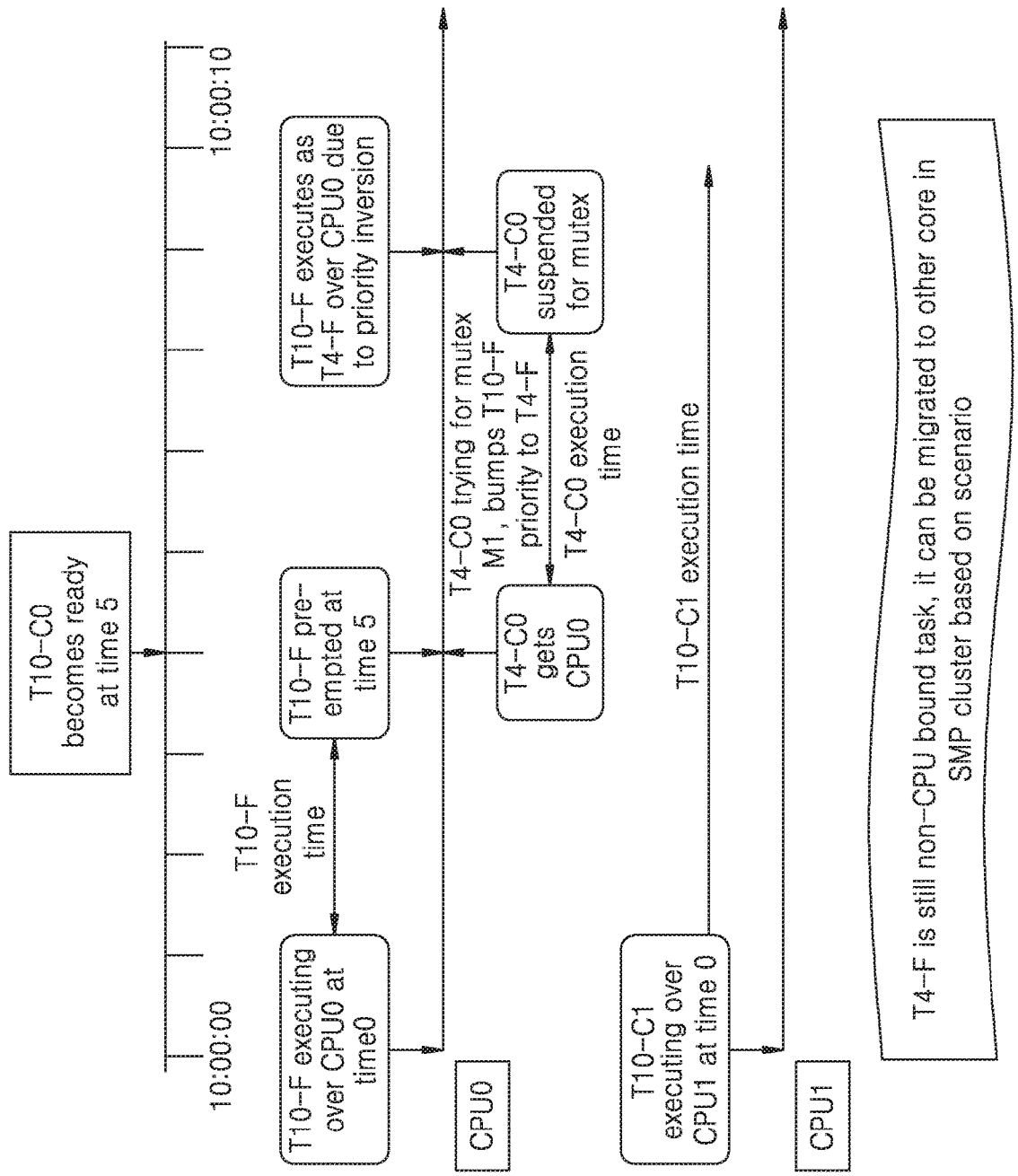
FIG. 3 is an example scenario illustrating priority inversion of the non-CPU bound task by the CPU-bound task, according to the prior art.

FIG. 3 is an example scenario illustrating priority inversion of the non-CPU bound task by the CPU-bound task and requesting for a mutex which is held by the non-CPU bound task, by the CPU-bound task, according to the prior art.

The mutex is a synchronization entity (e.g., a synchronization resource, a lock for use with multiple competing threads, processes, tasks, etc.) which is a part of (e.g., is inherent and/or available on) all types of operating systems, including but not limited, to Unix, Linux, custom kernels, Real time operating systems (RTOS), etc. The mutex (e.g., a mutual exclusion object) are program objects that are created so that multiple program tasks may take turns in sharing the same system resource, such as access to a file, a heap, a global resource, a software component, a hardware component, a core, a processor, etc. The mutex acts like a key that is used to guard a shared resource when multiple competing actors attempt to access the shared resource at the same time (e.g., simultaneously). For example, when the one or more task wants to access the shared resource, the task(s) must first obtain the key (e.g., the mutex) before they are granted permission to access the shared resource. When the task has finished accessing the shared resource, it must release the key (e.g., mutex), which thereby allows other tasks to obtain the key (e.g., mutex) and then access the shared resource. Only the task that has obtained the mutex will be allowed to access the shared resource and execute in, for example, a critical section of the CPU at a specific instant of time. A priority inversion occurs when, for example, a higher priority task tries to acquire the mutex associated with a CPU which is already held by a lower priority task. The lower priority task which holds the mutex must release the mutex before the higher priority task may be executed. This causes a delay which is unavoidable.

As another example, consider the task of a lower priority (e.g., a mutex owning task) is having access to a CPU shared resource and the lower priority task is executing in the critical section of the CPU. If the task of the higher priority (e.g., a mutex requesting task) preempts the task of lower priority and requests the same mutex (e.g., the mutex which is held by the task of the lower priority), then the priority of the mutex requesting task will be allocated to the mutex owning task and the mutex owning task will execute at the higher priority. Therefore, the process of allocating the priority of the higher priority task to the lower priority task, to enable the lower priority task to execute at the higher priority is called priority inversion.

Referring to FIG. 3, consider two tasks T10-F and T4-C0 are scheduled on CPU 0 by the scheduler (not shown). At time 0, the task T10-F is executing on CPU0, while no other tasks are ready to execute on CPU1.

The task T10-F has acquired the mutex M1 and is executing on CPU0. The task T10-C1 is executing on CPU1. At time 5, the higher-priority task T4-C0 becomes ready for execution on CPU0 and pre-empts the lower priority task T10-F. Further, since the task T4-C0 is a CPU bound task which is bound to CPU 0, the scheduler cannot schedule the task T4-C0 over to CPU1, even though CPU1 is executing a lower priority task or if CPU 1 is idle. The task T10-F has not completed executing on the critical section of CPU0 and hence the task T10-F has not released the mutex M1 (i.e., the task T10-F owns the mutex M1 even after being pre-empted).

The task T4-C0 after executing for a period of time tries to acquire the mutex M1 held by the task T10-F. However, the task T4-C0 will not be able to acquire the mutex M1 because the task T10-F, which holds the mutex M1, has not released the mutex M1. This will lead to the bumping of the priority by the task T10-F to the task T4-F. This will make the task T4-F the highest priority task at that instant (e.g., at that time). The task T10-F will execute at the priority 4 and not at the priority 10. Further, until the release of the mutex M1, the task T10-F will execute with the priority of 4 as the task T4-F due to priority inversion. The task T4-F will release the mutex M1 when it completes execution in the critical section of CPU 0. Since, the task T4-F is still a non CPU bound task (i.e., free running task) there is a possibility that the task T4-F is preempted and migrated to another CPU within the SMP cluster, based on the scenario. Even though the priority of the lower priority task is bumped to the higher priority task, it is still lacking in terms of determinism as it still executes as the non CPU bound task and may be migrated to other CPU based on different scenarios which leads to a delay in the execution of the higher priority mutex suspended task and also leads to additional cache thrashing.

Figure 4:
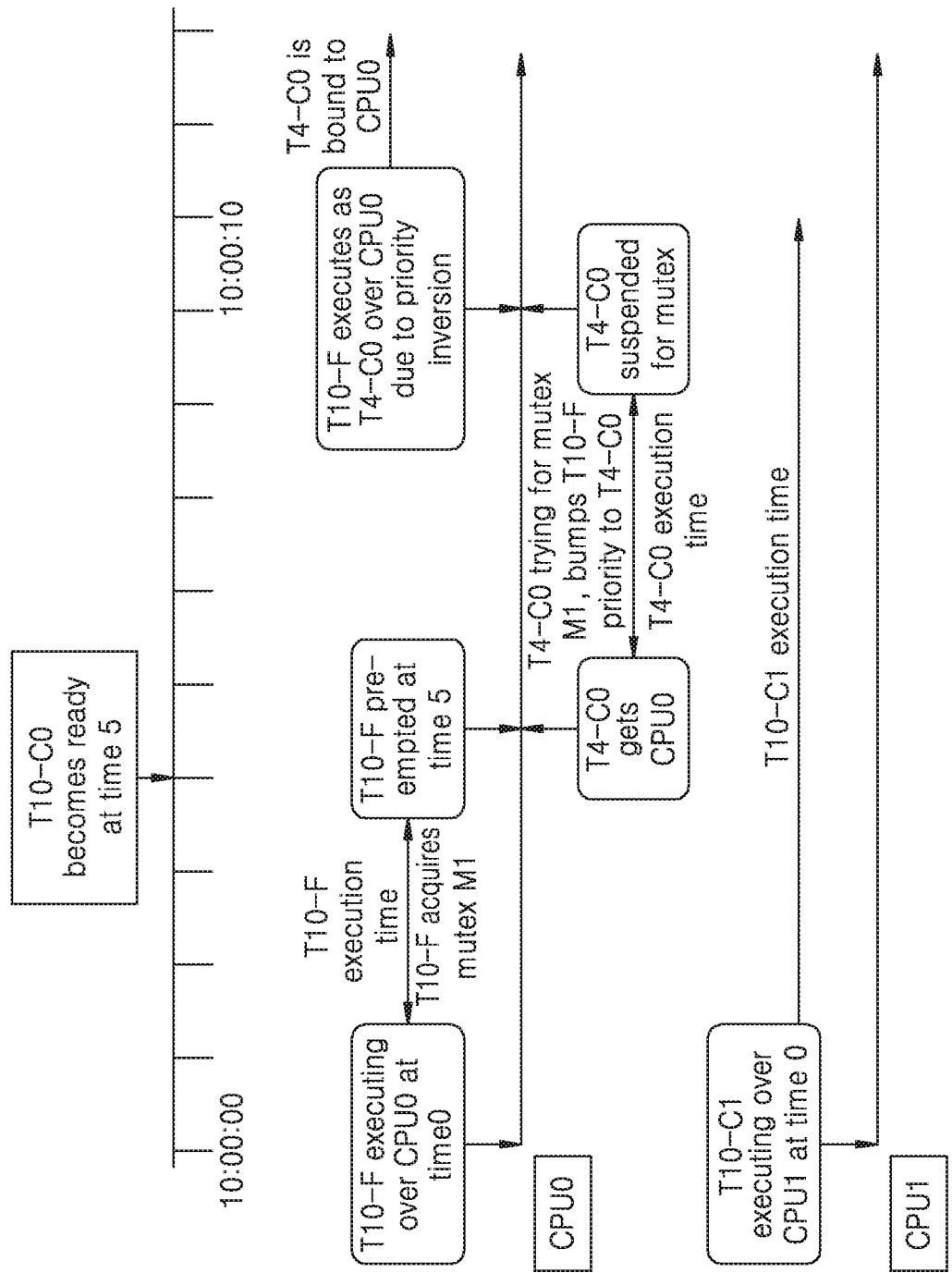
FIG. 4 is an example scenario illustrating priority inversion of the non-CPU bound task holding the mutex and scheduling of the non-CPU bound task by binding the non-CPU bound task to the specific core over which the CPU bound task is executing, according to at least one example embodiment.

FIG. 4 is an example scenario illustrating priority inversion of the non-CPU bound task holding the mutex and scheduling of the non-CPU bound task by binding the non-CPU bound task to the specific core over which the CPU bound task is executing, according to at least one example embodiment.

Unlike the conventional art methods and systems, where after a priority inversion of the tasks the bumped non CPU-bound tasks may be migrated to another CPU for execution, at least one example embodiment binds the bumped non CPU-bound task to the specific core (and/or specific processor) where the CPU bound task is executing to avoid migration of the bumped non CPU-bound task to another CPU for execution until the bumped non CPU-bound task releases the critical resource (e.g., the mutex). Thus, the binding of the bumped non CPU-bound task to the specific core where the CPU bound task is executing will avoid any delay involved in releasing the critical resource due to task context transfer (e.g., loading context data associated with the task back into memory) and/or preemption due to any other CPU higher priority activities.

Referring now to FIG. 4, in conjunction with FIG. 3, consider two tasks T10-F and T4-C0 are scheduled on CPU 0 by the scheduler (not shown). The task T10-F is executing while no other tasks are ready to be executed at time 0.

The task T10-F acquires the mutex M1 while executing on CPU 0. But before task T10-F is able to complete execution and release the mutex M1, the task T10-F (e.g., priority 10) is pre-empted by the higher-priority task T4-C0 (e.g., priority 4) that becomes ready at time 5. Since priority 4 is a higher priority level than priority 10 according to this example embodiment, the task T4-C0 is scheduled to execute on CPU 0 at time 5. Also, the task T4-C0 is a CPU bound task bound to CPU 0 and cannot be scheduled for execution on CPU 1, even if CPU 1 is executing a lower priority task or if CPU 1 is idle. Further, the task T4-C0 after executing for some time will try to acquire the mutex M1 held by the task T10-F. However, the task T4-C0 will not be able to acquire the mutex M1, as the task T10-F which holds the mutex M1 has not released the mutex M1 because it has not completed execution. This will lead to the bumping of priority of task T10-F to the priority level of task T4-C0.

The scheduler allows the non-CPU bound task T10-F to bump the priority and also to convert the non-CPU bound task to the CPU bound task, i.e., the non-CPU bound task T10-F is converted to the same priority level as CPU bound task T4-C0. The bumping of priority will provide the task T4-C0 with the highest priority at that instant of time and the task T4-C0 will execute at priority 4 as the CPU bound task. Further, the conversion of the non-CPU bound task into a CPU bound task is carried out by binding the non-CPU bound task to the specific CPU and hence there will not be a delay involved due to task context transfer and/or preemption due to other high priority activities. Further, the task T4-C0 will complete execution inside the critical section of the CPU and release the mutex M1.

The task T10-F executing on CPU 0 as the non-CPU bound task will be utilizing the resources of CPU 0, such as the cache, etc. If the task T10-F is moved to one of the other CPUs due to preemption, the task T10-F cached content stored in the cache(s) associated with CPU 0 will be lost. The conversion of the bumped non-CPU bound task T10-F to the CPU bound task T4-C0 provides continuity in execution of the bumped non-CPU bound task and provide determinism to the system.

In at least one example embodiment, the scheduler records the average execution time of the CPU-bound tasks. When the execution time of the CPU-bound task is found to be below a certain desired threshold, a forced re-alignment of the non CPU-bound task to the other CPU may be deferred. If the other CPU activity finds the pending non CPU-bound task as having higher priority, the scheduler has two options:

1. To allow the other CPU to pick the higher priority non CPU-bound task for execution which will reduce core idling.
2. To disallow (e.g., deny, restrict, etc.) the other CPU from picking the higher priority non CPU-bound task for execution, thereby ensuring better cache utilization.

In embedded systems, a tightly coupled memory (TCM) stores more frequently accessed code and data (e.g., high priority code and/or data). In at least one example embodiment, high priority code and/or data of the CPU is placed in the TCM of the CPU and the conversion of non-CPU bound task to CPU bound task will provide unhindered access to this high priority code of the CPU.

In another example embodiment, a copy of the code for the critical section is placed in the TCM of all of the CPUs.

The conversion of the non-CPU bound task to the CPU bound task will provide access to the code for the critical section which is placed in the TCM of the CPU.

Figure 5:
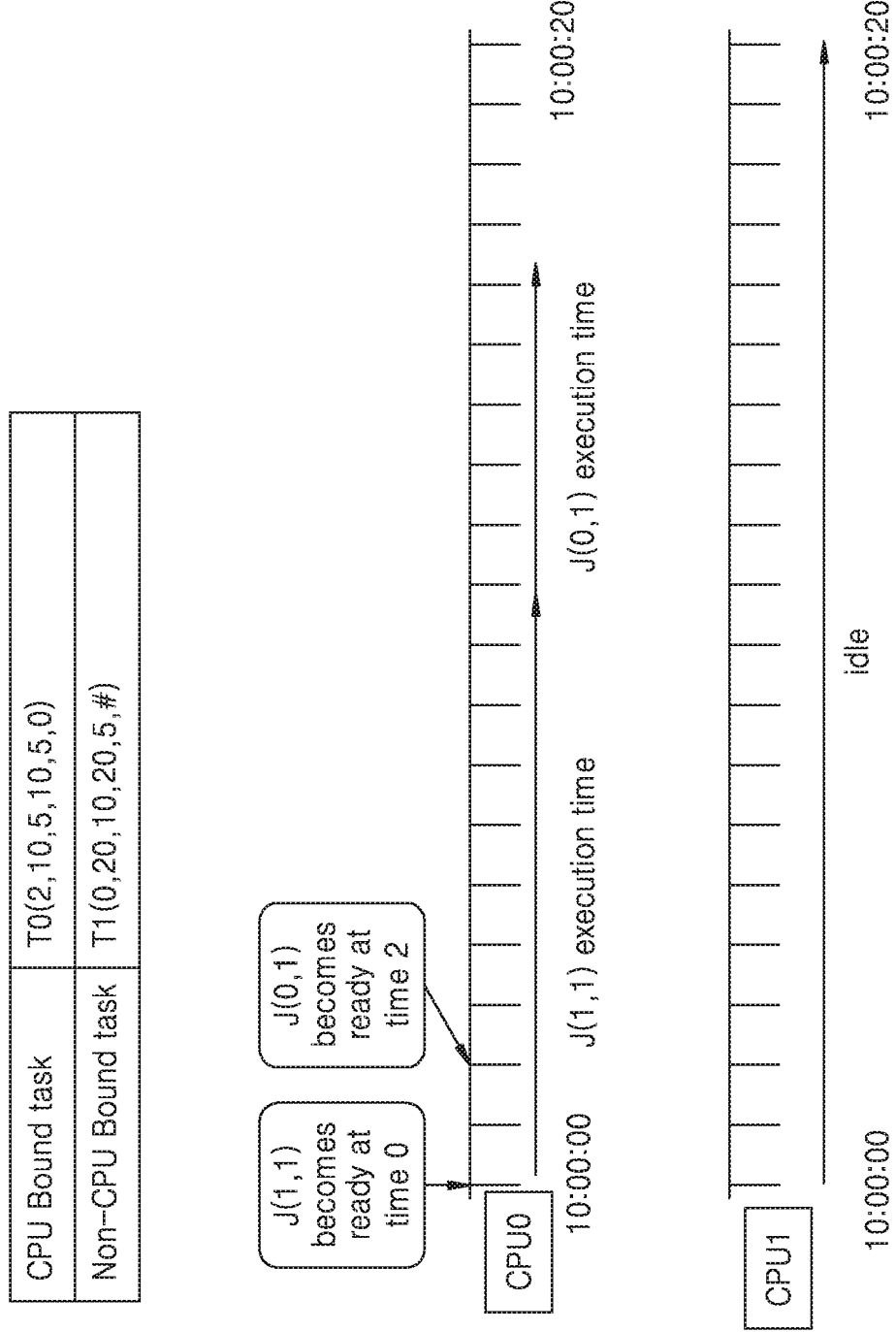
FIG. 5 is an example scenario illustrating scheduling of the CPU bound task and the non-CPU bound task in which jobs in the CPU bound task miss a deadline, according to the prior art.

FIG. 5 is an example scenario illustrating scheduling of the CPU bound task and the non-CPU bound task in which jobs in the CPU bound task miss the deadline, according to the prior art.

Referring now to FIG. 5, consider a sequence in which two periodic tasks T0 and T1 are scheduled on CPU 0. The periodic task T (i) is defined by various parameters which include phase, period, execution time, relative deadline, priority and core affinity, etc. The parameters are described as phase φ (i) is the first time the task arrives on the timeline, period ρ (i) is the time after which the task will reoccur again, execution time e (i) is the time required for execution of the task, relative deadline D (i) is the deadline within which the task has to be completed after which the task will expire, prio (i) is the priority of the task, bind(i) is the core affinity of the task, i.e., defining the type of the task as CPU bound or non CPU bound.

The tasks are periodic and may reoccur at the next period. Hence, job J, represents the task present at that instant of time. Every task may have any number of jobs, i.e., any task may reoccur any number of times periodically.

Consider the tasks T0 (2, 10, 5, 10, 5, 0) and T1 (0, 20, 10, 20, 5, #) which are CPU bound and non-CPU bound respectively. Job J (1, 1) of T1 becomes ready at time 0. Since no other task is ready at time 0 the job J (1, 1) starts execution at time 0. Further, the job J (1, 1) has the execution time of 10 msec. Even though job J (0,1) of task T0 becomes ready at time 2, the task T0 will not be allowed to execute on CPU 0 as the task T1 is already executing on CPU 0, based on the FIFO order. Further, since the task T0 is bound to CPU 0, it cannot be executed on CPU 1 even if CPU 1 is idle. Hence, the task T0 will have to wait until the execution of the task T1 is complete. Further, the relative deadline D (i) of the task T0 is 10 msec and the execution time of the non-CPU bound task T1 is 10 msec, hence the jobs in task T0 will miss the relative deadline.

Figure 6:
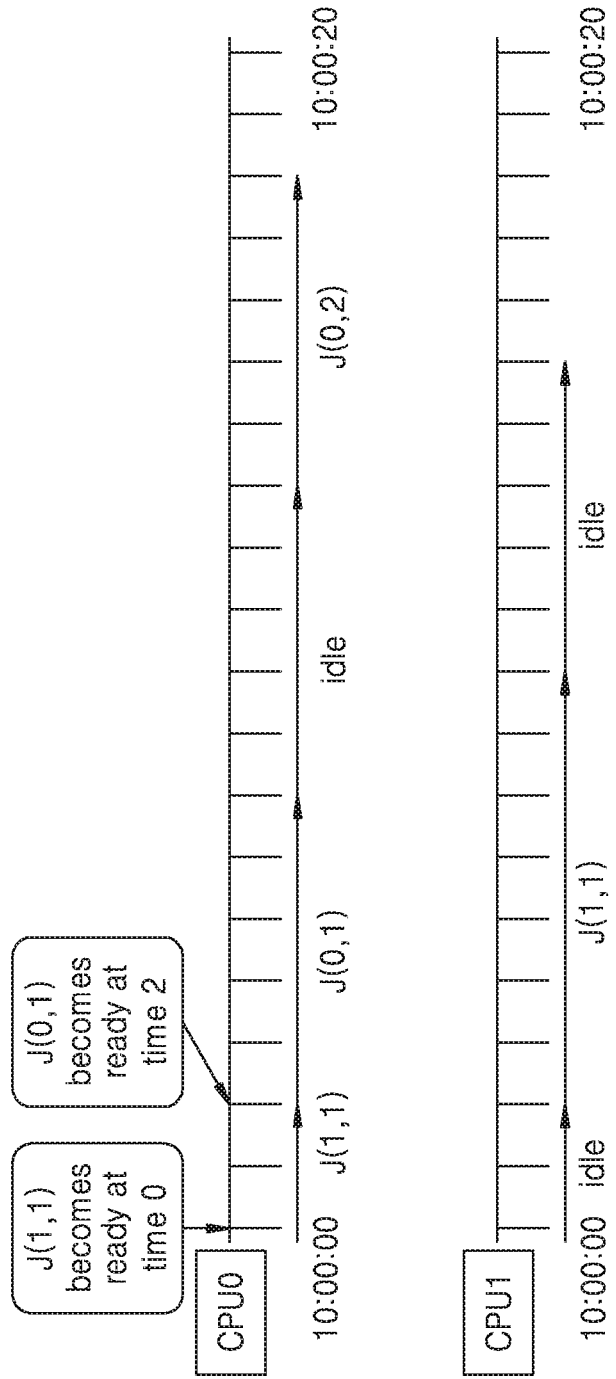
FIG. 6 is an example scenario illustrating scheduling of the CPU bound task and the non-CPU bound task by providing the higher preference to the CPU-bound task over the non CPU-bound task such that jobs in the CPU bound task do not miss the deadline, according to at least one example embodiment.

FIG. 6 is an example scenario illustrating scheduling of the CPU bound task and the non-CPU bound task by providing the higher preference to the CPU-bound task over the non CPU-bound task such that jobs in the CPU bound task do not miss the deadline, according to at least one example embodiment.

In the conventional art methods and systems, the jobs within the tasks miss the deadline by which the tasks have to be executed because the tasks are scheduled based on the FIFO ordering mechanism which does not take the type of the task and execution time of the tasks into consideration. Unlike the conventional art methods and systems, at least one example embodiment schedules the tasks by considering the type of the tasks, which ensures that the jobs within the tasks (e.g., the tasks include a plurality of jobs) do not miss the deadline within which the tasks have to be executed.

Referring to the FIG. 6, in conjunction to the FIG. 5, consider a sequence in which two periodic tasks T0 and T1 are scheduled on CPU 0.

The tasks T0 (2, 10, 5, 10, 5, 0) and T1 (0, 20, 10, 20, 5, #) are CPU bound and non-CPU bound, respectively. The job J (1, 1) of the task T1 becomes ready at time 0. Since no other task is ready at time 0 the job J (1, 1) starts execution at time 0. At time 2, the job J (0, 1) of the task T0 becomes ready. Since the task T0 is a CPU bound task, the scheduler will provide higher preference to the CPU-bound task over the non CPU-bound task, i.e., the scheduler will preempt the job J (1, 1) of the task T1 at time 2 and allow the job J (0,1) of the task T0 to execute on CPU 0. Hence, the job J (0, 1) of the task T0 will not miss the relative deadline of 10 msecs. Further, since CPU1 is in idle state, the job J (1, 1) of the task T1 is migrated to CPU 1 and executed on CPU1.

The scheduling of the tasks by providing higher preference to the CPU-bound task over the non CPU-bound task allows the execution of the tasks within the deadline. Further, the scheduling mechanism of at least one example embodiment ensures better system utilization by executing the job J (1, 1) of the task T1 on CPU1 which was in an idle state. Thus, scheduling of the tasks by considering the type of the tasks provides enhanced CPU utilization and CPU efficiency.

Figure 7:
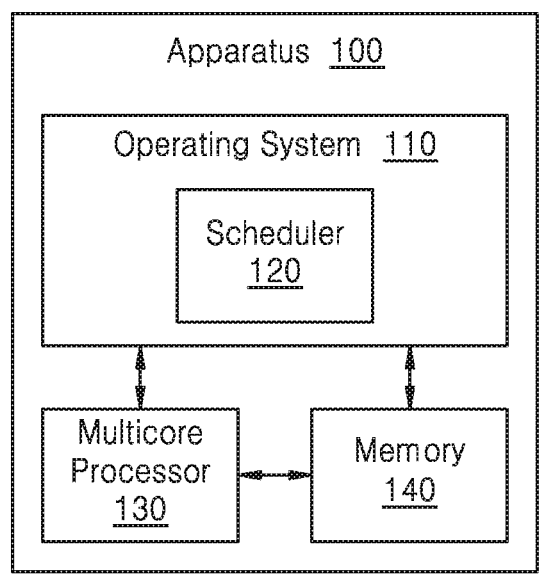
FIG. 7 is a block diagram illustrating various components of an apparatus for operating system (OS) scheduling of the CPU-bound tasks and non-CPU bound tasks having same the priority on a multicore processor, according to at least one example embodiment.

FIG. 7 is a block diagram illustrating various components of an apparatus 100 for improving and/or optimizing operating system (OS) scheduling of the CPU-bound tasks and the non-CPU bound tasks having same priority on the multicore processor 130, according to at least one example embodiment.

In at least one example embodiment, the apparatus 100 may be, for example, a mobile phone, a smart phone, Personal Digital Assistants (PDAs), a tablet, a wearable device, an Internet of things (IoT) device, a smart device, a personal computer, a laptop, a server, etc.

The apparatus 100 includes the operating system 110, the scheduler 120 as part of the operating system 110, the multicore processor 130 and the memory 140, but the example embodiments are not limited thereto. For example, In at least one example embodiment, the operating system (OS) 110 is system software that manages apparatus elements and software resources and is executed on at least one processor core and/or processor. The OS 110 may execute on a processor separate from multicore processor 130 and/or may execute on one or more of the processor cores of multicore processor 130. The scheduling principles described herein are for RTOS but may be applicable to any system.

In at least one example embodiment, the scheduler 120 which is part of the operating system 110 (e.g., the scheduler 120 may be included in operating system 110), may be configured to receive the plurality of tasks and queues the plurality of tasks in a desired and/or predefined sequence of execution on the multicore processor 130. The scheduler 120 identifies the plurality of tasks based on the type of the tasks as the CPU bound task and the non-CPU bound task.

Further, the scheduler 120 determines the priorities of the plurality of tasks. On determining that the plurality of tasks has different priorities, the conventional art mechanism of executing the tasks of the higher priority before executing the tasks of the lower priority is followed. On determining that the plurality of tasks have the same priorities, the scheduler 120 determines the task schedule for scheduling of the plurality of tasks.

The scheduler 120 determines the task schedule for scheduling of the plurality of tasks by providing higher preference to the CPU-bound task over the non CPU-bound task. Further, the scheduler 120 schedules the plurality of tasks based on the task schedule by deviating from the desired and/or predefined sequence of the tasks. Further, the scheduler 120 may also be configured to determine the task schedule based on the core execution history and core specific duration of the execution for all tasks which are stored in memory over a period of time.

In another example embodiment, the scheduler 120 may be configured to determine that the non-CPU bound task having lower priority has been preempted due to the condition required for the continued execution of the CPU bound task being met. For example, the condition required for the continued execution of the CPU bound task may be that the mutex (and/or semaphore, lock, etc.) is locked by the non CPU-bound task, but is not limited thereto.

Further, the scheduler 120 may be configured to detect that a priority inversion has occurred while executing the tasks. The priority inversion occurs when the CPU bound higher priority task tries to acquire the mutex which is already held by the non-CPU bound lower priority task. The mutex is associated with ensuring mutually exclusive execution of the code in the critical section of the CPU and/or access to the shared resource of the CPU. In general, the process of allocating the priority of the mutex requesting CPU bound higher priority task to the mutex owning non-CPU bound lower priority task, to enable the non-CPU bound task to execute at higher priority is referred to as priority inversion. Priority inversion will change the priority of the non-CPU bound task to a higher priority (i.e., the priority value of the CPU bound task will be allocated to the non-CPU bound task, or in other words, the priority value of the non-CPU bound task will be changed to be the same as the priority value of the CPU bound task).

However, the non-CPU bound task may still be migrated to another core when CPU bound tasks of higher priority arrive. Further, to ensure continued execution of the non-CPU bound task which owns the mutex at that instant of time, the scheduler 120 is configured to convert the non-CPU bound task which has undergone priority inversion into CPU bound task. The scheduler 120 converts the non-CPU bound task to CPU bound task by binding the non-CPU bound task to the specific core over which the CPU bound task is executing. The binding of the non-CPU bound task to the specific core ensures that the non-CPU bound task completes execution on the specific core and does not migrate to another core.

In at least one example embodiment, the scheduler 120 may be configured to store the CPU execution history and CPU specific duration of execution of all the tasks. Further, the scheduler 120 may be configured to learn based on the statistics of already executed tasks (e.g., the scheduler 120 is configured to examine past task execution statistics), the learning including at least one of a schedule aware, a task order aware, and a cache aware learning; and automatically schedule the tasks based on the learning.

In at least one example embodiment, the multicore processor 130 may be any type of processor, or processors, capable of executing software, such as a microprocessor, a digital signal processor, a microcontroller, or the like, which comprise two or more cores in the same cluster. According to at least one other example embodiment, the multicore processor 130 may be a multi-processor system, a distributed processing system, a cloud processing system, etc.

In at least one example embodiment, memory 140 may include non-volatile storage elements. Examples of such non-volatile storage elements may include magnetic hard discs, optical discs, floppy discs, flash memories, forms of electrically programmable memories (EPROM), and/or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 may be configured to store larger amounts of information than the memory. In certain examples, a non-transitory storage medium may store data that can, over time, change (e.g., in Random Access Memory (RAM), cache, registers, etc.).

Figure 8:
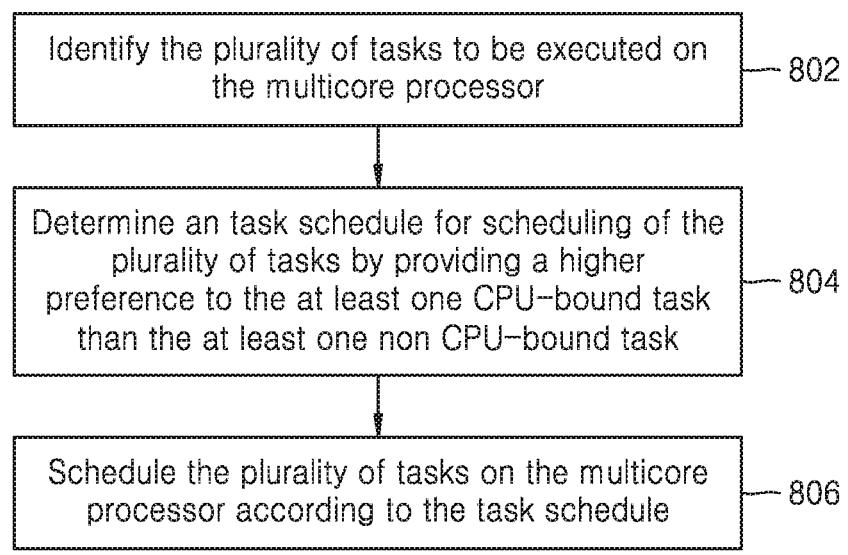
FIG. 8 is a flow chart illustrating a computerized method for scheduling of tasks by providing the higher preference to the CPU-bound task over the non CPU-bound task, according to at least one example embodiment.

FIG. 8 is a flow chart illustrating a computerized method for improved and/or optimized scheduling of tasks by providing the higher preference to the same priority CPU-bound task over the non CPU-bound task, according to at least one example embodiment.

Referring to FIG. 8, at operation 802, the apparatus 100 identifies the plurality of tasks with the same priority to be executed on the multicore processor 130. For example, in the apparatus 100 as illustrated in the FIG. 7, the scheduler 120 may be configured to identify the plurality of tasks with same priority to be executed on the multicore processor 130.

At operation 804, the apparatus 100 determines the task schedule for scheduling of the plurality of tasks by providing higher preference to the same priority CPU-bound task than the non CPU-bound task. For example, in the apparatus 100 as illustrated in the FIG. 7, the scheduler 120 may be configured to determine the task schedule for scheduling of the plurality of tasks by providing higher preference to the CPU-bound task than the non CPU-bound task.

At operation 806, the apparatus 100 schedules the plurality of tasks on the multicore processor 130 according to the task schedule. For example, in the apparatus 100 as illustrated in the FIG. 7, the scheduler 120 may be configured to schedule the plurality of tasks on the multicore processor 130 according to the task schedule.

Figure 9:
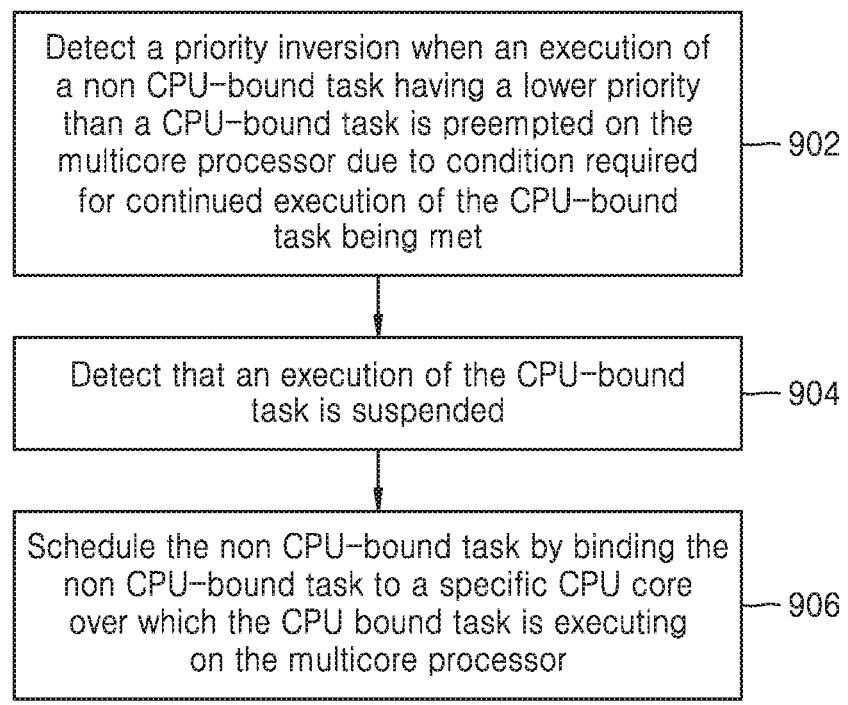
FIG. 9 is a flow chart illustrating a computerized method for scheduling of the tasks by binding the non CPU-bound task to the specific core over which the CPU bound task is executing, according to at least one example embodiment.

FIG. 9 is a flow chart illustrating a computerized method for improved and/or optimized scheduling of the tasks by binding the non CPU-bound task to the specific core over which the CPU bound task is executing, according to at least one example embodiment.

Referring to FIG. 9, at operation 902, the apparatus 100 detects priority inversion when execution of the non CPU-bound task having lower priority than the CPU-bound task is suspended on the multicore processor due to the condition required for continued execution of the non CPU-bound task being met. For example, in the apparatus 100 as illustrated in the FIG. 7, the scheduler 120 may be configured to detect priority inversion when execution of the non CPU-bound task having lower priority than the CPU-bound task is suspended on the multicore processor due to the condition required for continued execution of the CPU-bound task being met.

At operation 904, the apparatus 100 detects that the execution of the CPU-bound task is completed. For example, in the apparatus 100 as illustrated in the FIG. 7, the scheduler 120 may be configured to detect that the execution of the CPU-bound task is completed.

At operation 906, the apparatus 100 schedules the non CPU-bound task by binding the non CPU-bound task to the specific core over which the CPU bound task is executing on the multicore processor 130. For example, in the apparatus 100 as illustrated in the FIG. 7, the scheduler 120 may be configured to schedule the non CPU-bound task by binding the non CPU-bound task to the specific core over which the CPU bound task is executing on the multicore processor 130.

Various example embodiments disclosed herein may be implemented using at least one software program running on at least one hardware device and performing network management functions to control the elements.

The foregoing description of the specific embodiments will so fully reveal the general nature of the example embodiments herein that others can, by applying current knowledge, readily modify and/or adapt for various applications such specific embodiments without departing from the inventive concepts, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of various examples, those skilled in the art will recognize that the example embodiments herein may be practiced with modification within the spirit and scope of the example embodiments as described herein.

We claim:

1. A computerized method for scheduling of tasks for an operating system on a multicore processor, comprising:
   identifying, using the multicore processor, a plurality of tasks with a same priority level to be executed on the multicore processor, the plurality of tasks comprising at least one CPU-bound task and at least one non CPU-bound task, the at least one CPU-bound task being at least one task bound to execute on a specific core of the multicore processor and the at least one non CPU-bound task being at least one task to be executed on any core of the multicore processor;
   determining, using the multicore processor, a task schedule for the plurality of tasks, the determining including assigning a higher preference to the at least one CPU-bound task from the plurality of tasks over the at least one non CPU-bound task from the plurality of tasks, the determining including,
      examining past task execution statistics, and
      automatically learning an order of execution of the plurality of tasks for the task schedule based on the past task execution statistics; and
   scheduling, using the multicore processor, the plurality of tasks on the multicore processor based on the task schedule.

2. The method of claim 1, further comprising:
   associating, using the multicore processor, the plurality of tasks with a desired sequence of execution of the plurality of tasks on the multicore processor; and
   scheduling, using the multicore processor, the plurality of tasks based on the task schedule which deviates from the desired sequence of execution of the plurality of tasks on the multicore processor.

3. The method of claim 1, further comprising:
   binding, using the multicore processor, the at least one non CPU-bound task to at least one core of the multicore processor while the at least one non CPU-bound task is accessing TCM (Tightly Coupled Memory) data; and
   continuing to execute, using the multicore processor, the at least one non CPU-bound task as a CPU-bound task until the accessing of the TCM data by the at least one non CPU-bound task is completed.

4. The method of claim 1, wherein the examining includes at least one of a schedule aware examination, a task order aware examination, and a cache aware examination.

5. A computerized method for scheduling of tasks for an operating system on a multicore processor, comprising:
   identifying, using the multicore processor, a plurality of first tasks to be executed on the multicore processor, the plurality of first tasks comprising at least one CPU-bound first task and at least one non CPU-bound first task, and each of the plurality of first tasks having a same priority level;
   determining, using the multicore processor, a task schedule for scheduling of the plurality of first tasks, the determining including assigning a higher preference to the at least one CPU-bound first task over the at least one non CPU-bound first task;
   scheduling, using the multicore processor, the plurality of first tasks on the multicore processor based on the task schedule;
   detecting, using the multicore processor, occurrence of a priority inversion when execution of the non CPU-bound first task is preempted on the multicore processor by a CPU-bound second task due to a condition required for continued execution of the CPU-bound second task being met, the CPU-bound second task having a higher priority than the non CPU-bound first task;
   detecting, using the multicore processor, that execution of the CPU-bound second task is suspended; and
   scheduling, using the multicore processor, the non CPU-bound first task for execution on the multicore processor, the scheduling including binding the non CPU-bound first task to a CPU core included in the multicore processor.

6. The method of claim 5, wherein the condition required for continued execution of the non CPU-bound first task comprises a mutex being locked by the non CPU-bound first task.

7. The method of claim 5, further comprising:
   examining, using the multicore processor, past task execution statistics; and
   automatically scheduling, using the multicore processor, the non CPU-bound first task based on results of the examining.

8. The method of claim 7, wherein the examining includes at least one of a schedule aware examination, a task order aware examination, and a cache aware examination of the past task execution statistics.

9. An apparatus for scheduling tasks, comprising:
   a memory having stored thereon computer readable instructions; and
   a multicore processor comprising a plurality of CPU cores, the multicore processor configured to execute the computer readable instructions to,
      identify a plurality of tasks to be executed on the multicore processor, the plurality of tasks comprising at least one CPU-bound task and at least one non CPU-bound task, and each of the plurality of tasks having a same priority level, the at least one CPU-bound task being at least one task bound to execute on a specific core of the multicore processor and the at least one non CPU-bound task being at least one task to be executed on any core of the multicore processor,
      determine a task schedule for scheduling of the plurality of tasks, the determining including assigning a higher preference to the at least one CPU-bound task over the at least one non CPU-bound task, the determining including,
         examining past task execution statistics, and
         automatically learning an order of execution of the plurality of tasks for the task schedule based on the past task execution statistics, and
      schedule the plurality of tasks on the multicore processor based on the task schedule.

10. The apparatus of claim 9, wherein the multicore processor is further configured to:

associating the plurality of tasks with a desired sequence of execution of the plurality of tasks on the multicore processor; and scheduling the plurality of tasks based on the task schedule which deviates the sequence of execution of the plurality of tasks from the desired sequence of execution of the plurality of tasks on the multicore processor.

11. The apparatus of claim 9, wherein the multicore processor is further configured to:

bind the at least one non CPU-bound task to at least one core of the multicore processor while the at least one non CPU-bound task is accessing TCM (Tightly Coupled Memory) data; and continue execution of the at least one non CPU-bound task as a CPU-bound task until the accessing of the TCM data by the at least one non CPU-bound task is completed.

12. The apparatus of claim 9, wherein the examining includes at least one of a schedule aware examination, a task order aware examination, and a cache aware examination of the past task execution statistics.

* * * * *